United States Patent [19]

Suarez et al.

[11] Patent Number: 4,724,733

[45] Date of Patent: Feb. 16, 1988

[54] APPARATUS FOR CUTTING TUBING

[75] Inventors: Rod A. Suarez, Forest Pk.; William F. Prater, Smyrna; Robert Astin, Morrow, all of Ga.

[73] Assignee: Dixie Numerics, Inc., Atlanta, Ga.

[21] Appl. No.: 792,649

[22] Filed: Oct. 29, 1985

[51] Int. Cl.⁴ ................. B23D 25/04; B23D 21/00; B26D 1/60

[52] U.S. Cl. ........................... 83/159; 83/320; 83/286; 83/294; 83/639; 83/308; 83/371

[58] Field of Search ............. 83/320, 308, 287, 294, 83/369, 639, 371, 286, 310, 158, 159; 140/140

[56] References Cited

U.S. PATENT DOCUMENTS

| | | | |
|---|---|---|---|
| 1,936,331 | 11/1933 | Lawson | 83/308 |
| 2,340,870 | 2/1944 | Edwards et al. | |
| 2,612,912 | 10/1952 | Brekle | 140/140 |
| 2,630,177 | 3/1953 | Dellinger | |
| 2,947,184 | 8/1960 | Olson | 74/69 |
| 3,178,974 | 4/1965 | Roess | 83/287 |
| 3,776,082 | 12/1973 | Plegat | 83/286 |
| 3,800,645 | 4/1974 | Alcock et al. | 83/287 |
| 3,869,948 | 3/1975 | Rau | 83/286 |

FOREIGN PATENT DOCUMENTS 1333914 10/1970 United Kingdom ............ 83/308

Primary Examiner—Donald R. Schran
Attorney, Agent, or Firm—Hurt, Richardson, Garner, Todd & Cadenhead

[57] ABSTRACT

An apparatus for cutting an elongated workpiece of indefinite length into articles of predetermined length, in continuous fashion. The apparatus includes drive rollers to feed the workpiece, horizontal and vertical straightener rollers, and a movable carriage assembly which moves in a parallel path of travel to the workpiece. The free end of the workpiece contacts the carriage assembly and imparts movement to the assembly. The carriage assembly includes a cutter assembly for severing the workpiece, a stripper assembly for breaking the article from the workpiece, and a kick-out for sending the article to a storage bin.

14 Claims, 5 Drawing Figures

APPARATUS FOR CUTTING TUBING

BACKGROUND OF THE INVENTION

This invention relates to a device for cutting elongate work of indefinite length into articles of finite and desired length while the work is continuously advanced. As such, the invention relates to a "flying cutter" type of apparatus which, in general, is well known in the prior art as is evidenced by the Rau U.S. Pat. No. 3,869,948 of Mar. 11, 1975. The Rau patent involves a complex cutter mechanism which is so designed that when actuated, it approximates the linear speed of travel of the work but bears no direct drive relation with the work. Another type of mechanism of this general sort is depicted in the Edwards et al U.S. Pat. No. 2,340,870, but, in this case, the cutter is mounted on a carriage which can be clutched to the work so as to partake of he linear speed of travel of the work. In this case, the cutter is in the form of a saw operated through a cam and rocker assembly which rocks the saw and its drive motor to effect the cut. A similar type of arrangement is illustrated in the Plegat U.S. Pat. No. 3,776,082 of Dec. 4, 1973 and a variable speed transmission for driving a rotary saw in such an environment is illustrated in the Olson U.S. Pat. No. 2,947,184 of Aug. 2, 1960. A further patent which employs the work-gripping principle is illustrated in the Brekle U.S. Pat. No. 2,612,912 of Oct. 7, 1952 in which the work is gripped by a block which then travels with the work and initiates operation of a knife separate from the block. In order to minimize the inertia effects caused by the relatively heavy severing or like mechanism which is caused to grip the work and thus move with it, the mechanism of the Dellingerr U.S. Pat. No. 2,630,177 of Mar. 3, 1953 was developed. This patent relieves the work from some of the inertia load by imparting movement to the severing mechanism before it actually is caused to grip the work. These patents represent the closest prior art which is known in relation to the invention disclosed herein.

BRIEF SUMMARY OF THE INVENTION

The invention herein disclosed and claimed involves an assembly which is capable of operation with little or no operator attendance or control over long periods of time and without the need for adjustment or other supervisory acts.

In accord with this invention, the continuous axial longitudinal feeding movement of the work is employed periodically to impart movement to carriage means in unison with the movement of the work, initially by abutment of a cut-off free end of the work with a portion of the carriage means which is disposed in the path of the work and subsequently by the action of cutter means during the cutting cycle so when the cutter means is deactivated, that function terminates movement of the carriage means with the work and allows the carriage means to be returned to its home position in preparation for a subsequent cycle of operation.

Upstream of the cutting station there is located a stripper means which guides the work to the cutter means and downstream of the cutting station there is located a kick-off means for the article which is severed from the work. The stripper means and the kick-off means operate to deflect the work and the article, respectively, laterally with respect to the path of movement of the work, the former to assure a clean separation at the cutting station and the latter to direct the article to one side and away from the abutment portion of the carriage means. The stripper means and the kick-off means are operated sequentially of each other by and incidental to the cutting action and means is provided for adjustment of the sequence timing to assure proper operation.

Thus, in one sense, the invention is directed to an assembly wherein the work is fed along a path extending freely through a cutting station which is initially moved in unison with the work by engagement of a free end of the work with a portion of the carriage means and subsequently by virtue of the operation of the cutting means which then causes lateral deflection of the work upstream of the cutting station followed by lateral deflection of the article downstream of the cutting station, followed in turn by return of the cutting means toward its inoperative position to terminate the movement of the carriage means by the work and allow it to return to its home position in preparation for the next cycle of operation.

More specifically, the invention is concerned with an arrangement wherein a lightweight carriage means mounts abutment means as well as cutter means with the carriage means being movable parallel to the path of the work but resiliently urged to a home position. The abutment means is disposed in the path of movement of the free end of the work so that when the work engages same, the carriage means is moved in unison with the work and the operation of the cutter means is triggered. During the cutting cycle, the work is deflected aside with respect to the cutter means and then the resultant article is kicked aside out of contact with the abutment means followed by deactivation of the cutter means so that the carriage means is allowed to be automatically returned to its home position.

It is a feature of the invention that its operation is effected by fluid pressure so that the components carried by the carriage means may remain sufficiently light in weight as to impose as little impact loading on the work as is possible when the free end of the work engages the abutment means.

In conformity with the above, the cutting means is made of simple yet efficient configuration to employ a guillotine type of cutting action and, in particular to cut tubing so as to provide a new free end of the work and the trailing end of the article produced wherein these ends are necked down so as to facilitate insertion thereof into an opening such as in a ferrule. To this end, the invention is particularly adapted for use in producing spokes of stainless steel tubing useful for making spoke wheel covers for automobiles.

BRIEF DESCRIPTION OF THE DRAWING FIGURES

DETAILED DESCRIPTION OF THE INVENTION

Figure 1:
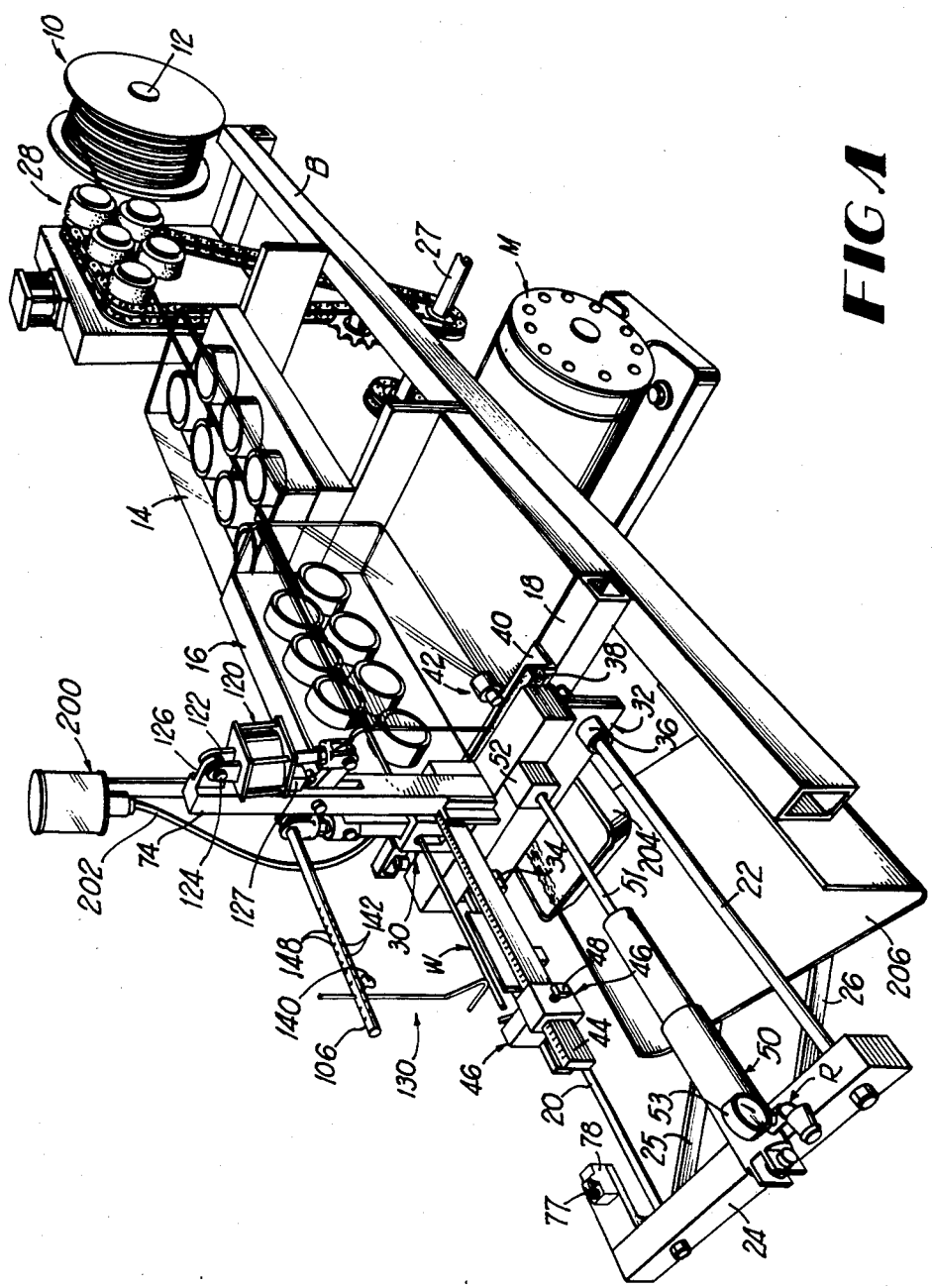
FIG. 1 is a perspective view illustrating a cutting machine in accord with this invention.

With reference to FIG. 1 the invention is illustrated in association with conventional entities normally employed in machines for cutting elongate work of indefinite length, i.e., tubing or the like, into articles of finite end predetermined length. Thus, a coil or supply roll of the work is shown wound on the reel 10 which is rotatably mounted on suitable support structure, not shown but normally positioned beyond one end of the cutting machine, by means of the shaft 12 so that the work W may issue therefrom to pass through the horizontal straightening roller assembly 14 and then through the vertical straightening roller assembly 16, both which are mounted on the bed B of the cutting machine. The cross piece 18 which is affixed to the bed B supports one end of each of the rails 20 and 22 which extend therefrom for connection at their other ends to a second cross piece 24 which, in the embodiment illustrated in FIG. 1, is secured rigidly to the bed B by means of suitable braces 25 and 26. Obviously, the cross piece 24 may be connected directly with the side members of the bed B in the fashion in which the cross piece 18 is secured to the bed.

The machine includes suitable drive means in the form of a variable speed electric motor M which through a chain and sprocket drive powers the shaft 27 which, in turn, powers the drive rolls 28, through a further sprocket and chain drive, which drive rolls are in the form of a pinch roll set which tractively feeds the work W from the supply roll 10. Thus, as is usual in machines of this kind, the drive means 28 feeds the work W longitudinally and axially along a path which passes through the two-plane straightening apparatus 14, 16.

After issuing beyond the straightening assembly, the work W passes freely through the cutting station 30 of this invention which is mounted on the carriage means indicated generally by the reference character 32. The carriage means is provided with suitable bearings or bushings 34 and 36 which receive the respective rails 20 and 22 and allow the carriage means to move back and forth parallel to the direction of the path of the work W in the manner set forth hereinafter. The carriage means 32 normally is urged to a home position in which it is positioned against the bumper pad 38 affixed to the mounting member 40 secured on top of the cross piece 18. A shock absorber 42 may also be used to prevent vibrational movement of the carriage means when it is returned to its home position, the shock absorber or damping device being fixed to the bed of the machine in any suitable fashion and being illustrated only in symbolic position in FIG. 1.

The carriage means 32 is provided with an arm 44 on which a travelling abutment means 46 is adjustbly secured as by the set screw 48. In general principle, the free end of the work W engages the abutment means 46 and imparts movement of the carriage means in unison with the movement of the work. The length of the article formed by cutting the work is adjusted by the positioning of the abutment means along the arm 44 and, for that purpose, the arm may be provided with a suitable scale or markings for accurately setting the desired length of the articles produced. As soon as the free end of the work has engaged the abutment means, the carriage means begins to move with the work in opposition to the return means which normally urges the carriage means to its home position. This return means is illustrated in the form of a pneumatic piston/cylinder assembly 50 the cylinder of which is secured to the cross piece 24 whereas the piston rod 51 carries the pressure block 52 which then engages the carriage means. The air pressure regulator R is adjusted to maintain a predetermined return pressure, indicated by the gauge 53, in the piston/cylinder assembly acting on the carriage means through the separate block 52.

Figure 2:
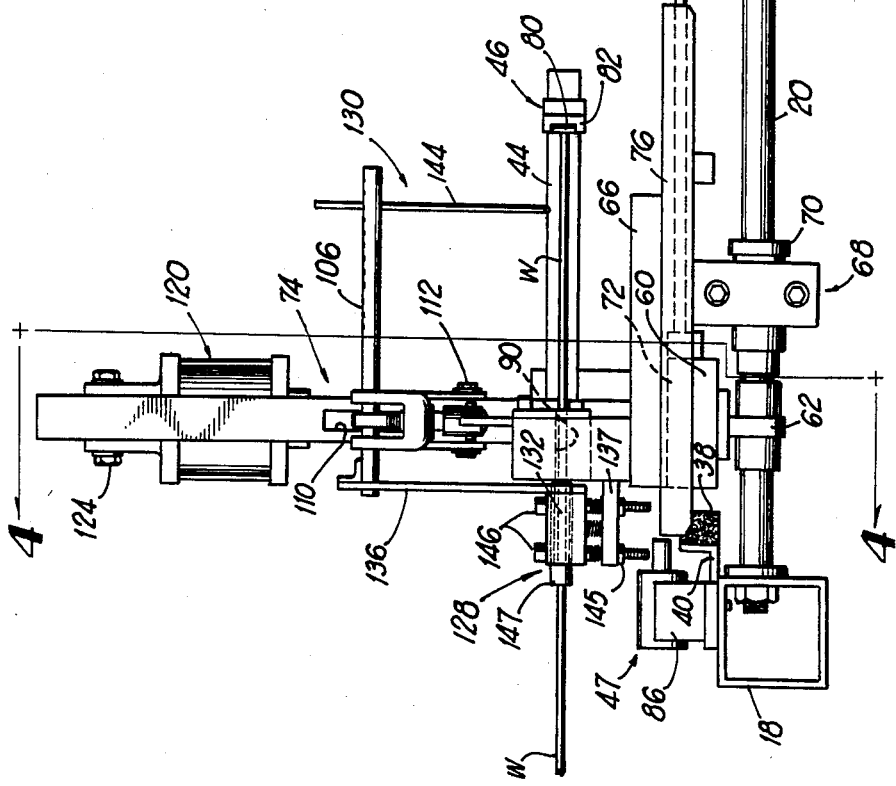
FIG. 2 is enlarged side elevational view of of the invention.

Preferably, the actuating devices of the invention are pneumatic because they can be made fast-acting and of light weight so as to minimize inertia loading imposed on the work at the moment of its engagement with the abutment means. For a better illustration of the carriage means and its associated entities, reference is now had to FIGS. 2 and 4 in particular. In the interest of providing a light weight assembly, the carriage means preferably comprises the travelling plate 60 bridging over the rails 20 and 22 and to the underside of which two bushing assemblies 62 and 64 are secured as shown best in FIG. 4. The angle member 66 is fixed to the travelling plate 60 and projects forwardly therefrom to mount a bushing block assembly 68 as illustrated in FIG. 2 to provide a further bushing 70 slidably receiving the rail 20. The base plate 72 overlies the travelling plate 60 and supports the lower end of the upstanding support post 74 which mounts the cutter means as well as the stripper means as described in detail below.

Also mounted on the travelling plate 60 is the safety switch bar 76 whose end reaches forwardly of the carriage means eventually to engage the rocker arm 77 of the safety device 78, the purpose of which will be presently apparent. In FIG. 2, the free end of the work W has engaged the abutment means 46 by contact with the clapper arm 80 thereof, hence to actuate the device 82 which commences the cutting cycle of operation as the carriage means is moving in unison with the work. When the carriage means is in its home or returned position, the opposite end of the bar 76 engages the rocker arm 84 of the home position device 86, the function and purposes of the various devices being described in conjunction with FIG. 5.

Figure 4:
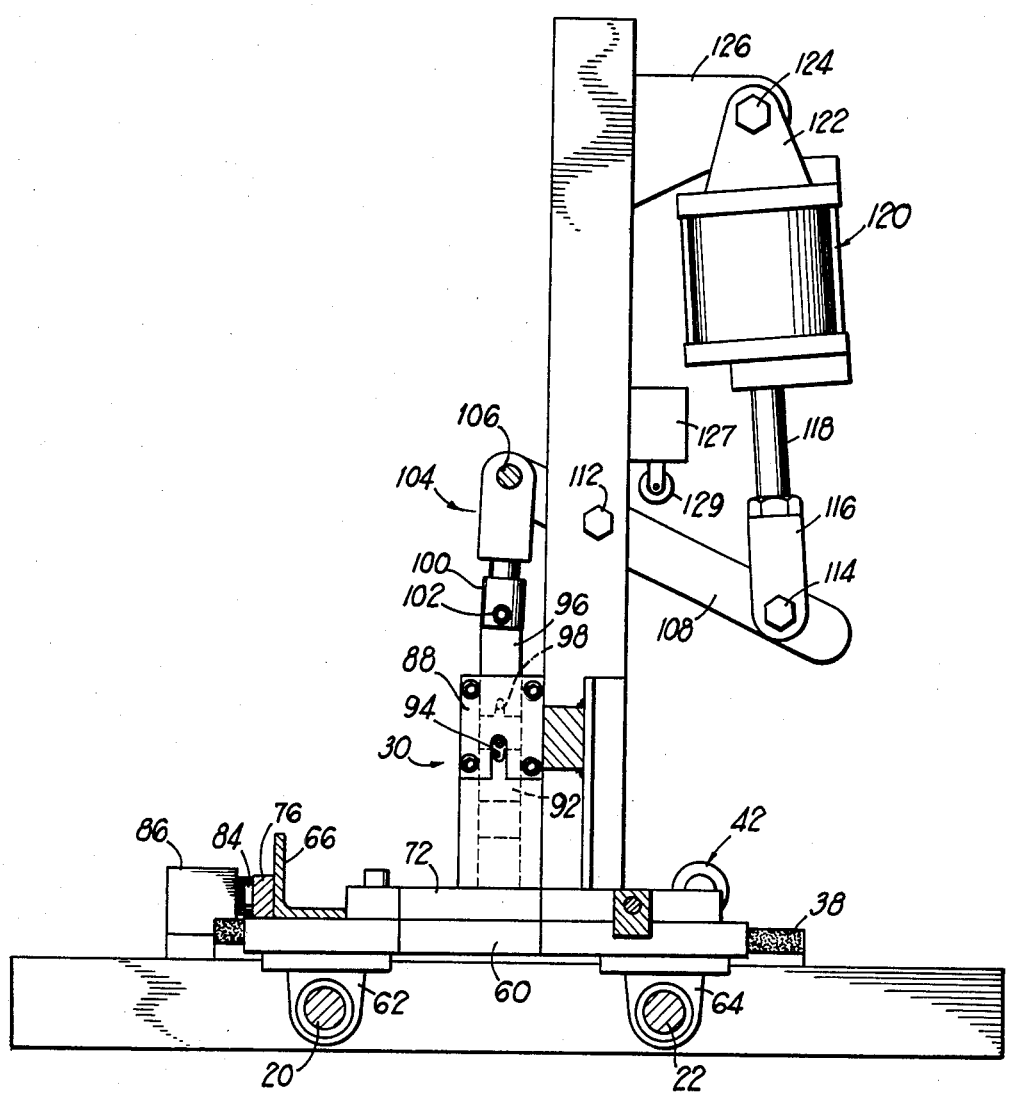
FIG. 4 is a cross-section taken along the plane of section line 4—4 in FIG. 2.

As is seen in FIG. 4, the cutting station 30 includes the housing 88 having a vertically elongate slot or passage 90 there-through which freely passes the work W. The housing 88 mounts the lower or fixed cutting blade 92 which is provided with the U-shaped cutting portion 94 and slidably mounts the movable or upper cutting blade 96 having the inverted U-shaped cutting portion 98. In order to form necked down free ends of the article, preferably the U-shaped cutting portions 94 and 98 are tapered to form a slot that is narrower than the outer diameter of the work. The movable blade 96 is offset from the fixed blade 92 so as to cooperate therewith in guillotine fashion. That is, the lower portion of the movable blade overlaps the upper portion of the fixed blade in closely adjacent relation therewith to effect the guillotine action by forcing the work W downwardly into the notch of the fixed blade 92 until the two notches have so overlapped to such an extent as to cut through the work W. In this regard, the cutting blades illustrated are adapted to cut tubing material.

As illustrated best in FIG. 4, the movable blade 96 is pinned at its upper end to the yoke 100 through the intermediary of the pivot pin 102. The yoke 100 forms part of a link 104 which is pivotally connected at 106 to the lever 108 at one end thereof. This lever passes through the slot 110 in the member 74 and is pivoted thereto by means of the pivot pin 112. The opposite end of the lever 108 is pivotally connected at 114 to the yoke 116 adjustably attached to the end of the piston rod 118 of the piston/cylinder assembly 120 having a bracket 122 pivoted at 124 to the ear 126 on the upstanding member 74. The adjustment between the yoke 116 and the piston rod 118, which determines the relative position of the movable blade 96 with respect to the fixed blade 92 in the final cutting position, is made such that this final position assures the proper penetrations of the blades through the work. The device 127 as illustrated in FIG. 4 is mounted on the structure 74 so that its actuator 129 is disposed in the path of the lever 108 so that the device 127 is operated when the cut is completed. The device 127 causes the cutting action to terminate and return the movable blade 96 to its raised position in preparation for the next cycle.

Figure 3:
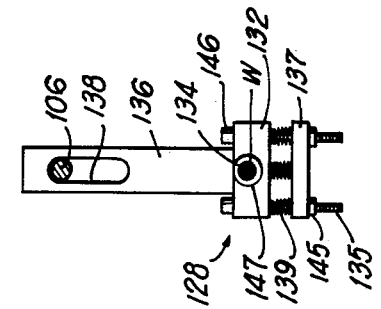
FIG. 3 is an enlarged view illustrating the stripper means and its actuating mechanism.

The connection at 106 to establish the pivot between the link 104 and the lever 108 is in the form of an elongate rod, as will be seen from FIG. 2, and this rod is responsible for operation of the stripper means 128 and the kick-out means 130 in proper timed relation with respect to each other and relative to the cutting action. As illustrated in FIG. 3, the stripper means comprises the base 132 which is provided with a bore 134 through which the work W passes with clearance and is mounted for vertical movement relative to the carriage means by virtue of the threaded pins 135 which are threaded or slidable through the mounting plate 137 fixed to the carriage means, the base 132 normally being raised to an elevated position relative to the plate 137 by the springs 139. The stripper means thus "floats" relative to the carriage means and is normally spring urged to a raised position with respect thereto. The stripper means 128 is also vertically adjustable in relative position to mounting plate 137 by turning nuts 145 which will in turn raise or lower threaded pins 135 relative to mounting plate 137. Springs 139 tend to urge base 132 upwardly against heads 146 of threaded pins 135 so that by vertically adjusting pins 135 by rotating nuts 145, base 132 is also vertically adjusted. This allows stripper means 128 to be properly aligned with passage 90 of housing 88 so that work W is fed along an essentially vertical path. Hollow guide tube 147 passes through bore 134 in base 132 to aid in aligning work W between stripper means 128 and housing 88. The vertically elongate slot 138 in the plate 136 receives the rod 106 and the vertical adjustment of the plate is made such that the rod 106 bottoms in the slot 138 and begins to move the work downwardly with it as the cutting action is being completed. It has been found that this action is important in assuring that the work is properly separated from the blades and is cleanly severed from the article produced beyond the cut, thereby forming a clean new free end on the work. Just after the stripper means begins to move downwardly, the kick-out means is adjusted to swing into engagement with an article produced by the cut and thus kick it out or laterally deflect it from the engagement with the abutment means. This adjustment is made by first manually, vertically adjusting kick-out wire or member 144, which is slidably received in one of several bores 148 of rod 106, to a selected vertical position, and then by rotating the wing nut 140 which is received into one of several threaded bores 142 in rod 106 to rigidly engage kick-out wire 144 and vertically adjust the kick-out wire or member 144 to the correct vertical position for engaging the article at a selected moment after the stripper means has begun its downward movement. Of course, the kick-out wire or member 144 may be adjustably fixed onto rod 106 by any suitable means along the length of rod 106, but it is preferred that the member 144 be positioned along rod 106 so that it engages work W near its end which engages the abutment means 46.

It will be appreciated that the cutting means when actuated to the cutting position establishes a new position at which the work imparts the unison movement of the carriage means with the work. Thus, by a combination of a gripping-like action and a blocking type action against the newly formed free end of the work W, the previous free end of the work which now forms one end of the article, is relieved of the function of maintaining the carriage means moving in unison with the work. This movement continues even when the article is kicked aside and teminates only when the cutting means is deactivated and the movable blade has retreated sufficiently to allow the work once again to pass freely through the slot 90 in the housing 88. At this time, the return means 50 is effective to return the carriage means to its home position.

Figure 5:
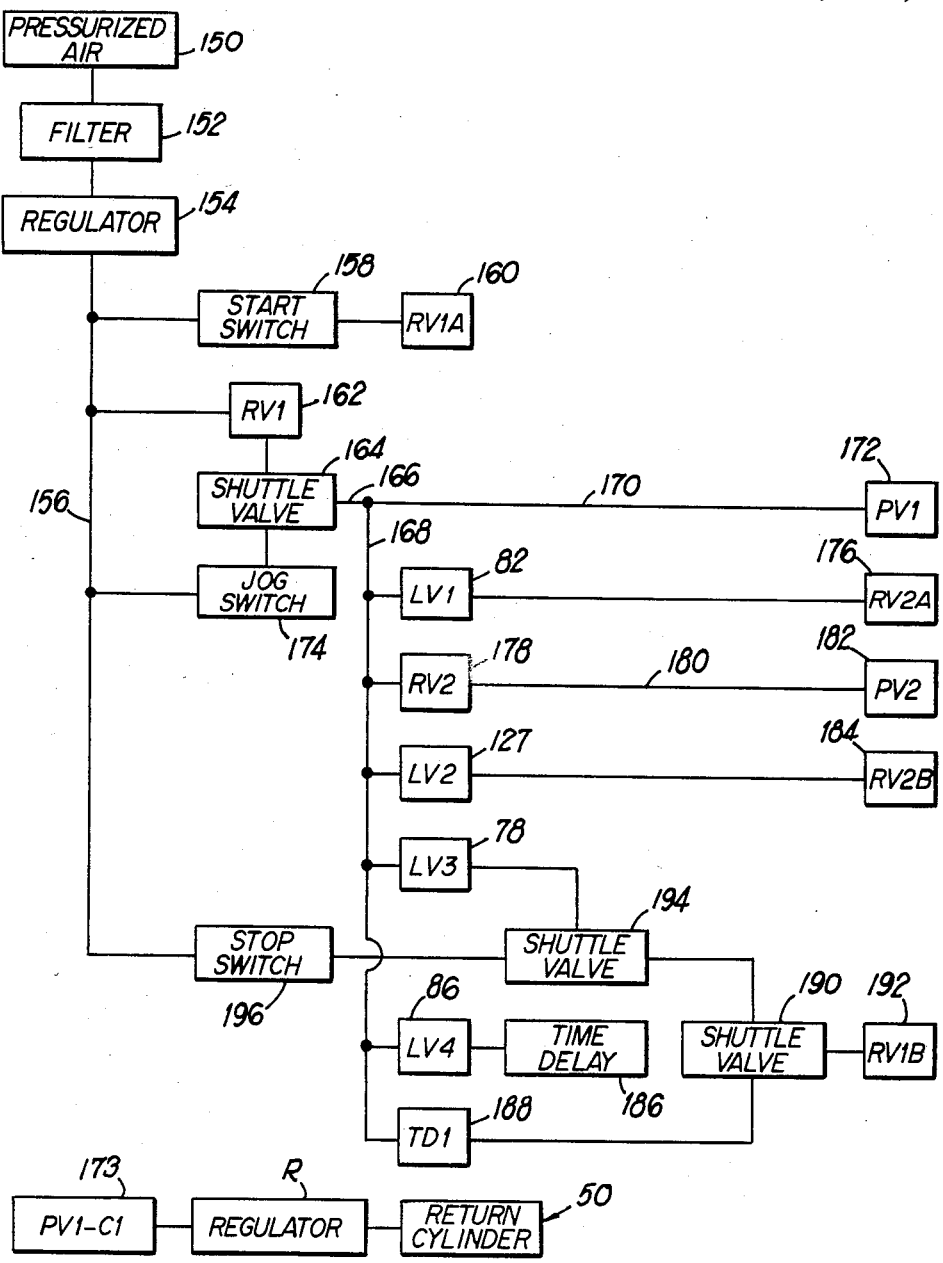
FIG. 5 is a schematic view illustrating the various control elements of the invention.

With reference now to FIG. 5, the various control functions of the invention will be apparent therefrom. The various devices 78, 82, 86, and 127 previously mentioned are limit valve structures in the pneumatic circuit schematically illustrated in FIG. 5. The pressurized air source 150 is filtered at 152 and regulated as to pressure at 154 to provide the main control line 156 from which several control entities are branched. A relay valve 158 functions as a start switch so that when it is actuated, the relay valve control 160 operates the relay valve 162 to provide input to the shuttle valve and provide air pressure at its output line 166 to provide supply to the line 168 and, directly, to the line 170 leading to the power valve 172. The power valve 172 functions to engage the drive rollers 28 with the work W issuing from the work supply 10. For starting the system when the work supply is loaded, the normally closed valve 174 may be manually operated in "jog" fashion to control the feed of work to and through the two plane straightening assemblies 14 and 16 and through the stripper means and the slot 90 at the cutting station. Thereafter, the starting valve 158 may be actuated to commence automatic cycling operation. When the free end of the work engages the clapper 80, the limit valve 82 is operated to provide pressurized air to the relay valve control 176 which provides an input to the relay valve 178 to provide air pressure at the line 180 to the power valve 182. The power valve 182 causes the piston/cylinder assembly 120 to commence the cutting stroke and its related stripper means and kick-out means movements. When the cutting stroke is completed, the limit valve 127 is actuated to power the other control 184 for the relay valve 178 to terminate the cutting stroke and allow the piston/cylinder assembly to return to its normal position as illustrated in FIG. 4. The carriage means now is returned to its home position and when it has, the limit valve 86 is actuated to actuate the time delay control 186 which provides an input to the time delay valve 188 for a predetermined period of time to maintain this valve closed during such period of time. The time delay period is set so that if the system is operating normally wherein the carriage means is returned within the period of the set time delay, a new time delay period is set before the preceding one has expired. If not, the time delay valve 188 opens to provide air pressure to one input of the shuttle valve 190 and thus actuate the relay valve control 192 for the relay valve 162, thus closing the relay valve 162 to shut the machine down.

Another way the machine may be shut down automatically is if the overtravel limit valve 78 is actuated. This provides air pressure to one input to the shuttle valve 194 which thereby provides an input to the shuttle valve 190 to cause shut down as already explained. The other input to the shuttle valve 194 is from the manual shutdown valve 196 which, being normally closed, may be opened manually by an operator to actuate an input to the shuttle valve 194 and cause the machine to shut down.

As is also illustrated in FIG. 5, the power valve 173 controls air pressure through the regulator R to the return means 50.

Returning to FIG. 1, it will be seen that an oil reservoir 200 having a drip line 202 routed to the cutting blades is provided, the drip pan 204 being used to collect any excess oil. The lubrication of the cutting station is important in that considerable heat is generated during repeated cutting cycles and it is of interest to allow prolonged runs of the machine without interruption and also without any special supervisory action except possibly periodic unloading of the bin 206 which collects the articles kicked out when finished.

What is claimed is:

1. A machine for cutting elongate work of indefinite length into articles of predetermined length, which comprises the combination of:
    feeding means for feeding the work to move axially and continuously;
    carriage means having a portion disposed in the path of the work for imparting movement to the carriage means to shift in unison with the work and return means for automatically returning said carriage means to a predetermined home position upon cessation of movement of the carriage means with the work; and
    means on said carriage means for sequentially cutting the work to produce an article of said predetermined length, means for laterally deflecting the work upstream of the location of the cutting to assure separation of the article from the work and means for laterally the article relative to the carriage means to prepare the carriage means to be returned automatically to said home position thereof in preparation for the production of the next subsequent article.

2. A machine as defined in claim 1 wherein the means for laterally deflecting the work and the means for laterally deflecting the cut article effect the respective lateral deflections of the work and the article sequentially at upstream and downstream locations relative to the location at which the article is severed from the work and including adjustable means for varying the timing sequence of such deflections.

3. A machine as defined in claim 2 wherein said means on said carriage means for sequentially cutting the work effects a guillotine cutting of the work, said adjustable means being actuated by said means for sequentially cutting the work in timed relation to the cutting of the work.

4. A machine as defined in claim 1 including means for deactivating said feeding means in response to a predetermined excessive movement of said carriage means from its home position.

5. A machine as defined in claim 1 wherein the means for sequentially cutting the work, the means for laterally deflecting the work, and the means for laterally deflecting the cut article are prepared for actuation only when said carriage means is in its home position.

6. A machine as defined in claim 1 wherein said return means continuously urges said carriage means to said home position.

7. A machine for cutting elongate work of indefinite length into articles of finite length, which comprises the combination of:
    means for feeding elongate work to move axially and continuously along a path;
    carriage means for movement back and forth parallel to said path and including abutment means positioned in said path for intercepting a free end of the work and causing said carriage means to move from a home position in unison with said work;
    means for resiliently urging said carriage means to said home position whereby in the absence of movement of the carriage means with the work the carriage means is automatically returned to said home position;
    cutter means mounted on said carriage means for cutting off the work as the carriage means moves from said home position and including blade means which forms a new free end on the work and operates sequentially to continue the movement of the carriage means in unison with the work and then to withdraw to permit the carriage means to be returned to its home position;
    stripper means receiving the work upstream of said cutter means for laterally deflecting the work relative to said path;
    kick-out means for laterally deflecting the cut article relative to said path;
    and mechanism causing said stripper means to deflect the work laterally of said path just prior to lateral deflection of the article by said kick-out means.

8. A machine for cutting elongate work stock of indefinite length into pieces of predetermined length, which comprises the combination of:
    a frame;
    a carriage slidably carried by the frame for movement back and forth along a predetermined path;
    return means on said frame for constantly urging the carriage to a home position at one end of the path;
    feeding means on said frame for continuously and axially feeding work stock;
    stripper means carried by the carriage for transverse movement back and forth relative to the predetermined path, the stripper means having an opening complementary to and receiving the work stock with sufficient clearance to pass the work stock freely therethrough;
    kick-out means carried by the carriage for transverse movement back and forth relative to the predetermined path,
    a cutter assembly on the carriage adjacent to but pathwise downstream of the stripper means, the cutter assembly including guillotine cutter blades relatively movable between a gapped position which freely passes the work stock and an overlapped position which cuts through the work stock so that the end of the work stock abutting the guillotine cutter blades imparts movement to the carriage;
    said carriage having abutment means disposed in fixed, aligned relation to the opening in the stripper means and in pathwise downstream spaced relation to the cutter assembly to intercept the free end of the work stock passing freely through the stripper means and past the cutter assembly for imparting movement to the carriage in unison with the work in opposition to the return means, the abutment means being fixed relative to the cutter assembly to present a predetermined length of work to be severed by the cutter assembly to form the pieces severed from the work stock;

actuator means responsive to engagement of the free end of the work stock against said abutment means for moving the guillotine cutter blades to overlapped position to sever a piece of predetermined length from the work stock so as to relieve the severed piece from further movement of the carriage by transferring movement of the carriage to the end of the unsevered work stock which remains abutted against the guillotine cutter blades; and further means actuated by said actuator means while the guillotine cutter blades are overlapped for shifting the stripper means laterally to deflect the end of the unsevered work stock relative to the severed piece and for shifting the kick-out means laterally for kicking the severed piece from between the cutter assembly and said abutment means.

9. A machine as defined in claim 8 wherein said cutter assembly includes a member fixed to the carriage and having a work passage opening therethrough which is transversely elongate with respect to the path and disposed in transverse overlapping relation to the opening in the stripper means so as also to pass the work freely therethrough while permitting the stripper means to shift laterally with respect to the cutter assembly without bottoming the work stock in the work passage opening.

10. A machine as defined in claim 9 wherein the guillotine cutter blades comprise a first cutter blade fixed to that end of the member remote from the stripper means and a transversely movable guillotine cutter blade cooperable with the fixed blade to cut through the work.

11. A machine as defined in claim 14 wherein said actuator means comprises a lever pivotally mounted on the carriage, a piston/cylinder assembly on the carriage and connected to one end of the lever, a pivot rod carried by the other end of the lever, a link pivotally received on the pivot rod and connected to the guillotine cutter blade, lost motion means connecting the pivot rod to the stripper means for transversely moving the stripper means after the cutter blades are overlapped.

12. A machine for cutting elongate tubular stock of indefinite length into tubes of predetermined length, which comprises the combination of:

carriage means slidably mounted for movement back and forth along a predetermined path and including pneumatic means for continuously exerting a predetermined force on the carriage means to a home position at one end of the path;

guillotine cutter means on the carriage means for movement between a gapped position which freely passes tubular stock and an overlapped position which cuts through and blocks passage of the tubular stock;

stripper means on the carriage means adjacent the guillotine cutter means on the home position side thereof and having an opening freely passing tubular stock therethrough and resiliently mounted on the carriage means for transverse movement relative to the predetermined path between a normal position in alignment with the gapped position of the guillotine cutter means and a tube separating position offset from the overlapped position of the guillotine cutter means;

kick-out means mounted on the carriage for transverse movement relative so said predetermined path;

feeding means for continuously feeding tubular stock at a fixed speed through the stripper means and the gap presented by the guillotine cutter means;

abutment means disposed on the carriage means in fixed, aligned relation to the guillotine cutter means and in pathwise downstream spaced relation thereto for intercepting the free end of the tubular stock and imparting movement to the carriage in unison with the tubular stock in opposition to the return means;

actuator means responsive to engagement of the free end of the tubular stock against said abutment means for moving the guillotine cutter blades to overlapped position to sever a tube of predetermined length from the tubular stock and transfer movement of the carriage means to the overlapped guillotine cutter means; and further means actuated by said actuator means while the guillotine cutter means is in overlapped position for shifting the stripper means laterally into said tube separating position and for shifting the kick-out means laterally for kicking the cut tube from between the guillotine cutter means and said abutment means.

13. A machine as defined in claim 12 wherein said guillotine cutter means includes a member fixed to the carriage and having a work passage opening therethrough which is transversely elongate with respect to the path and disposed in transverse overlapping relation to the opening in the stripper means.

14. A machine as defined in claim 13 wherein said actuator means comprises a lever pivotally mounted on the carriage means, a pneumatic piston/cylinder assembly on the carriage means and connected to one end of the lever, a pivot rod carried by the other end of the lever, a link pivotally received on the pivot rod and connected to the guillotine cutter means, lost motion means connecting the pivot rod to the stripper means for transversely moving the stripper means after the guillotine cutter means is in overlapped position, said kick-out means being carried by the pivot rod and adjusted thereon to engage and laterally deflect the severed tube adjacent the abutment means.

* * * * *